United States Patent [19]

Lessard

[11] Patent Number: 4,913,203

[45] Date of Patent: Apr. 3, 1990

[54] TREE HARVESTER

[75] Inventor: Michel Lessard, Lac St. Jean, Canada

[73] Assignee: Less Micanik Inc., Lac St Jean, Canada

[21] Appl. No.: 345,181

[22] Filed: May 1, 1989

[51] Int. Cl.⁴ .............................................. A01G 23/08
[52] U.S. Cl. ................................... 144/34 E; 83/978; 83/607; 83/675; 144/2 Z; 144/3 D; 144/339
[58] Field of Search ................... 144/2 Z, 3 D, 34 R, 144/34 E, 335, 339, 343; 83/597, 598, 607, 675

[56] References Cited

U.S. PATENT DOCUMENTS

| | | | |
|---|---|---|---|
| 3,915,211 | 10/1975 | Barwise | 144/34 E |
| 3,946,776 | 3/1976 | Oldenburg | 144/34 E |
| 3,986,542 | 10/1976 | Guy et al. | 144/34 E |
| 4,131,144 | 12/1978 | Fischer | 144/34 E |
| 4,773,455 | 9/1988 | Lessard | 144/2 Z |

Primary Examiner—W. Donald Bray
Attorney, Agent, or Firm—Foley & Lardner, Schwartz, Jeffery, Schwaab, Mack, Blumenthal & Evans

[57] ABSTRACT

A tree shear is disclosed which has a frame on which is mounted a pair of blades for pivotal movement relative to one another in scissors fashion; the blades being pivoted by hydraulic jacks. Each blade pivots on a rotary shaft having an eccentric center portion, each blade being mounted on the eccentric portion so that, as the shaft rotates, it causes the blade to oscillate.

11 Claims, 4 Drawing Sheets

TREE HARVESTER

BACKGROUND OF THE INVENTION

1. Field of the invention

The present invention relates to a tree shear for felling trees and to a tree harvester having a tree shear-and-grapple head incorporating the aforesaid tree shear.

2. Description of the prior art

Known tree shears of the type to which the invention relates comprise a pair of shear blades that are pivoted, by powerful hydraulic jacks, like the two blades of scissors. When applied about the trunk of a tree to be felled and at its butt end, the sharp edges of the blade elements are forced into the trunk until the tree is severed from its base. The shearing pressure that must be applied to achieve felling has to be considerable since the knives or blade elements have to cut across the fibres of the tree trunk. In fact, severing of the tree is due to crushing as well as to shearing of the fibres. Now, this crushing action does not take place only in the shear plane but extends appreciably beyond that plane and, as a consequence, a not negligible part of the lower end of the tree is irremediably damaged insofar as using that part for making lumber boards is concerned.

SUMMARY OF THE INVENTION

It is an object of the invention to alleviate the damage caused by the shear blade crushing action mentioned above. This is obtained, according to the invention, by applying to the shear blades an oscillatory motion as well as the conventional scissors-like pivot motion so that the blades act much like the more efficient linearly-reciprocating manner of a straight saw.

More specifically and according to the invention, this principle is applied in a tree shear which comprises: a frame; a pair of shear blades mounted on the frame for pivotal movement relative to one another in scissors fashion, and power means for pivoting the blades, the tree shear being improved in that the blades are mounted on the frame by pivot means which include oscillation means for causing the blades to move back and forth in their own planes as they are pivoted by the power means.

Such oscillation means could be eccentric means which may, for instance, comprise, for each blade, a rotary shaft having an eccentric center portion on which the blade is mounted.

In a preferred form, the frame has a pair of parallel plates between which the shear blades are located, each rotary shaft then having a pair of coaxial trunnions solid with the eccentric center portions; bearing means mounting the trunnions on the plates for free rotation of the shafts and motor means for rotating the shaft.

The invention also relates to a tree harvester comprising:

an elongated boom;

a tree working head comprising: an elongated frame having a longitudinal axis; a pair of shear blades mounted on the frame for pivotal movement in scissors fashion relative to one another in a plane normal to the frame longitudinal axis, and power means for pivoting the blades;

wherein the blades are mounted on the frame by pivot means including oscillation means for causing the blades to move back and forth in the normal plane as the blades are pivoted by the power means;

means pivotally mounting the head on one end of the boom, and power means, on the head and on the boom, for so pivoting the head between a position wherein the head stands essentially parallel to the boom and a vertical position for shearing trees.

Other features of the invention will appear from the description that follows of a preferred embodiment having reference to the appended drawings.

BRIEF DESCRIPTION OF THE DRAWINGS

FIG. 1 is a plan view of a tree shear made according to the invention while

DESCRIPTION OF THE PREFERRED EMBODIMENT

Figure 1:
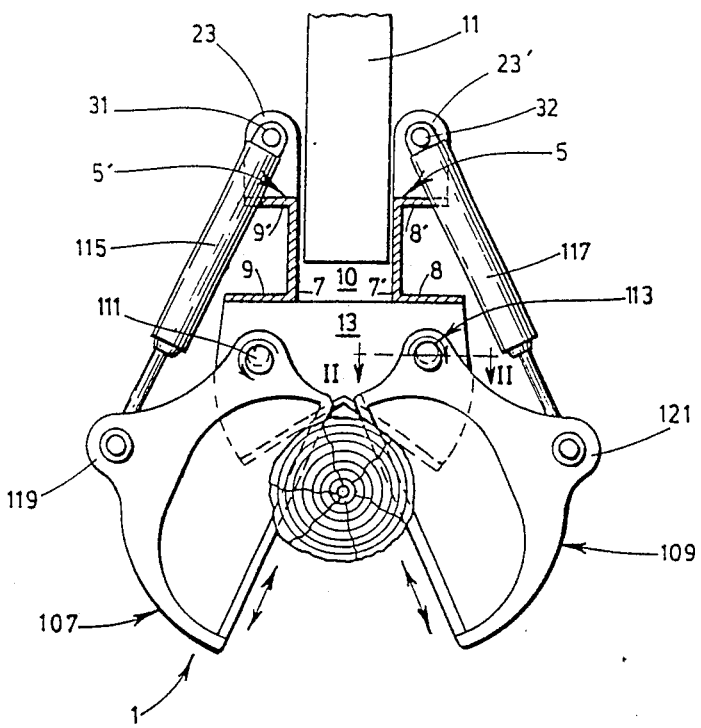

Referring to FIGS. 1 and 3 to 5, the tree shear 1 made according to the invention is mounted on a frame 3 made up of two spaced channel members 5, 5', each having a web 7, 7', and a pair of side flanges 8, 8'; 9, 9'; the two webs 7, 7', facing one another at a suitable distance between them defining a space 10 allowing insertion of the end of a boom 11; the side flanges 8, 8'; 9, 9', projecting away from this space 10.

Figure 5:
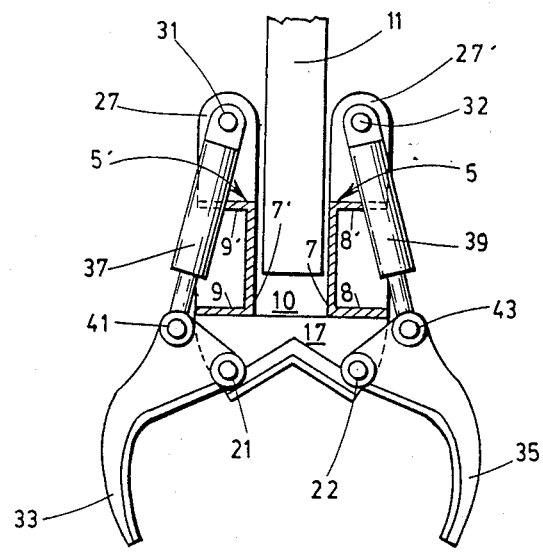
FIG. 5 is a plan view of a grapple assembly used in the head of FIGS. 3 and 4.

The channel-shaped members 5, 5', are held in spaced apart relationship by a series of plates 13, 15, 17 and 19, of which one edge is secured to the flanges 8, 9, of the two channel members 5, 5', as best seen in FIGS. 1 and 5. Plates 15, 17 and 19, are further interconnected by rods 21, 22. A series of ears 23, 25, 27 and 29, project from each of the opposite flanges 8', 9', of the channel members 5, 5', being preferably coplanar respectively with plates 13 to 19. The latter ears are also interconnected by rods 31, 32.

The two channel members 5, 5'; the plates 13 to 19, the ears 23 to 29 and the rods 21, 31, 32, constitute the frame 3.

As shown, the tree shear 1 is mounted on and between the plates 13 and 15 in a manner more fully described hereinbelow.

Figure 4:
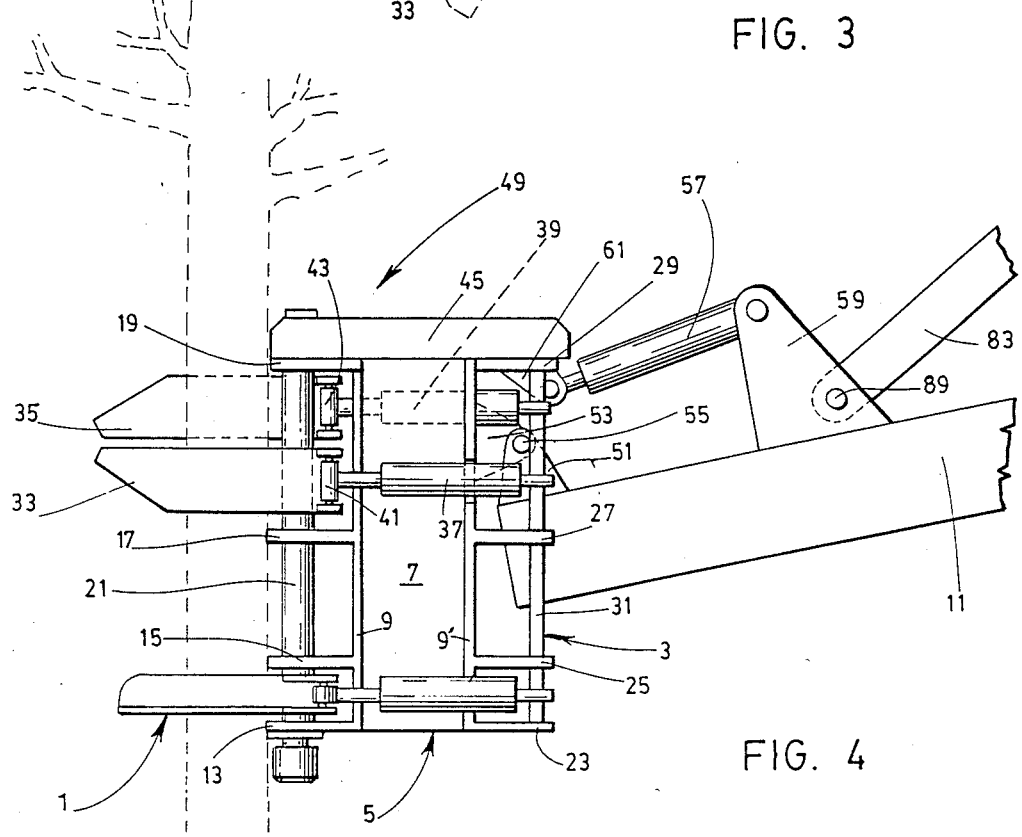

Above the tree shear 1, in FIG. 4, are a pair of conventional grappling arms 33, 35, which are pivotally mounted at one end on the rods 21, 22, (FIG. 5) and are spaced from one another, along the rods, to properly grasp the tree to be sheared. The grappling arms also serve to delimb the tree, as is known and as is briefly described hereinbelow with respect to FIG. 6. Arms 33, 35, are operated by hydraulic jacks 37, 39, of which the cylinders free ends are pivotally mounted on the rods 31, 32, and the piston rods free ends connected to the arms 33, 35, by pivot means 41, 43, intermediate their ends.

Finally, a conventional topping mechanism 45 having a retractible topping knife 47 (FIG. 3), for cutting off the tips of delimbed trees, is secured at the top end of the two channel members 5, 5', being for instance welded to their plate 19 and ears 29.

The frame 3, the tree shear 1, the grappling arms 33, 35, and the topping mechanism 45 form the working head 49 of the tree harvester. The head is pivotally mounted at the end of the boom 11 by two sets of cooperating brackets 51, 53, along each lateral edge of the boom 11 and on the flanges 8', 9', of the channel members 5, 5', only one set being shown. The brackets 51, 53, of each set are interconnected by a pivot 55. Pivoting motion is obtained by a hydraulic jack 57 pivoted, at its ends, respectively to a bracket 59 of the boom 11 and a further bracket 61 secured to and beneath the casing of the topping mechanism 45.

With the above arrangement, the working head 49 can be moved between a tree delimbing and topping position, where it stands essentially parallel to the boom 11 (FIG. 3), and a tree shearing position (FIG. 4).

Figure 6:
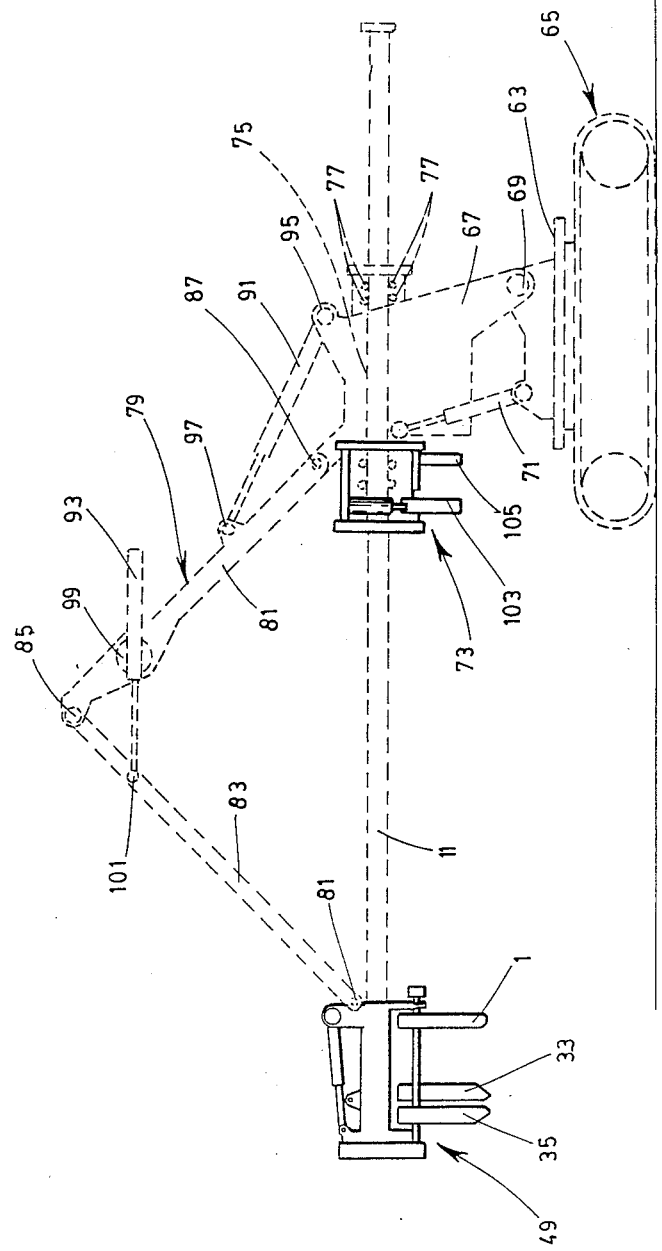
FIG. 6 is a side elevation view of a tree harvester making use of the head of FIGS. 3 and 4.

The working head 49 may be used particularly efficiently with the tree harvester as described fully in my prior applications in Canada No. 550,073 of Oct. 23, 1987 and in the U.S., No. 110,428 of Oct. 20, 1987, and diagrammatically shown in FIG. 6. It comprises a pedestal 63 mounted on a tracked vehicle 65 for rotation about a vertical axis. An operating base 67 is pivoted at 69 on the pedestal 63, being tilted by a hydraulic jack 71. A grapple assembly 73, having grappling arms 103, 105, similar to arms 33, 35, is mounted at the forward end of the base 67. The latter and the body of the grapple assembly 73 are formed with a through passage 75 into which the straight boom 11 may be slid, being guided by suitable rollers 77. Sliding movement of the boom 11 is obtained by means of a hinged boom 79 having an inner section 81 and an outer section 83 articulated at their common end by a pivot 85. Section 81 is additionally pivoted at 87 to the bas 67 while section 83 is pivoted at 89 to the bracket 59 (see FIGS. 3 and 4) at the free end of the boom 11. A first hydraulic jack 91 interconnects the boom section 81 and the base 67 while a pair of further jacks 93, one on either side of the hinged boom 79, joins the two sections 81, 83, over the pivot 85; the interconnections being by means of pivot joints 95, 97, 99, 101.

It will be appreciated that synchronized actuation of the jacks 91, 93, moves the free end of the boom 11 and the working head 49 toward or away from the base 9.

In operation, once a tree has been felled by the shear 1 and held by the gripping arms 33, 35, the working head 49 is brought close to the base 67, by closing in of the hinged boom sections 81, 83, and the butt end of the tree solidly gripped by the jaws 103, 105, of the grapple assembly 73. At that time, the grapple arms 33, 35, of the working head 49, slightly loosen their hold on the tree and the hinged boom sections 81, 83, made to open up, causing the boom 11 and the head 49 to be moved leftward. With butt end of the tree held fast by the jaws 103, 105, of the grapple assembly 73, the grapple arms 33, 35, then act as delimbing members shearing the branches off the tree trunk.

Figure 2:
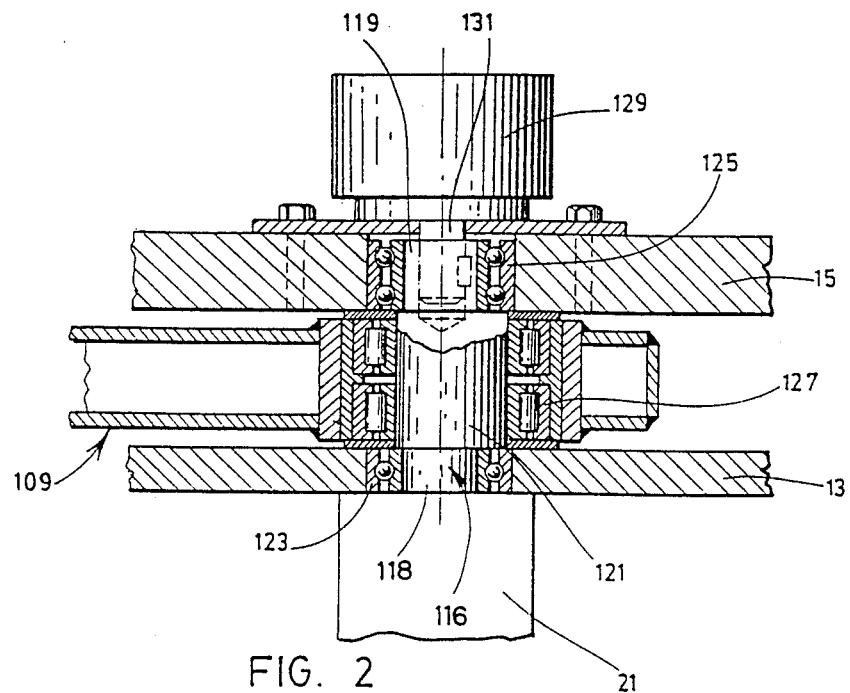
FIG. 2 is a cross-section taken in a plane along line II—II in FIG. 1 and shown on an enlarged scale.
Figure 3:
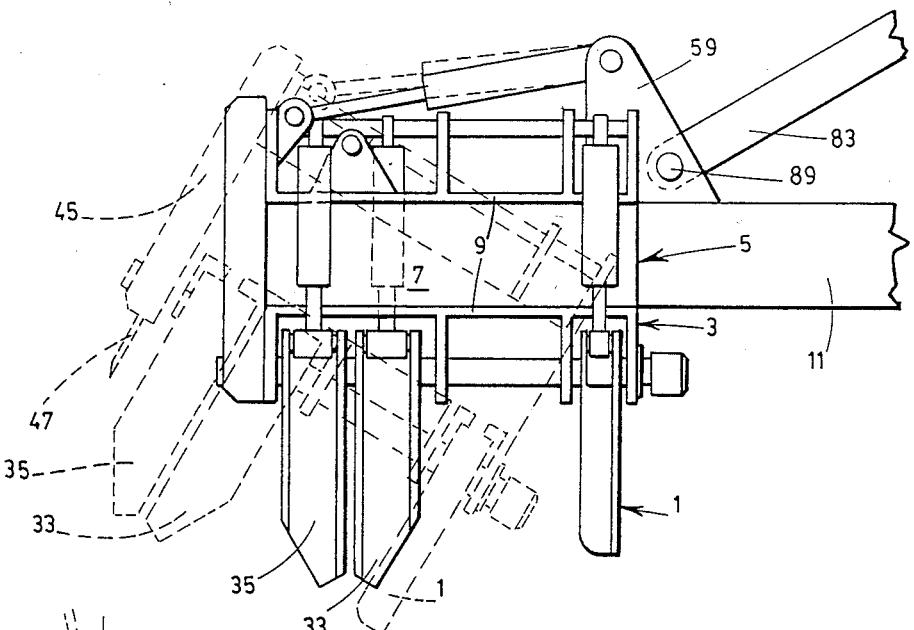
FIGS. 3 and 4 are side elevation views of a tree working head incorporating the improved tree shear of the invention and showing the head in the tree delimbing position and an intermediate position, in FIG. 3, and in tree-shearing position in FIG. 4.

Referring now to FIGS. 1 and 2, the tree shear 1 has a pair of shear blades 107, 109, of essentially standard construction, mounted on and between the two plates 13, 15, (edgedly fixed to the flanges 8 and 9 of the channel members 5, 5',) by pivot means 111, 113. As said before, the latter pivot means include oscillation means that cause the blades 107, 109, to move back and forth, in their own planes, as shown by the arrows, when the blades are pivoted by suitable power jacks 115, 117, of which the ends are pivoted on the rods 31, 32, and on peripheral ears 119, 121, of the blades 107, 109. The pivot means 113 are shown in detail in FIG. 2; pivot means 111 being identical to means 113 so that only the latter need be described.

As shown, pivot means 113 comprises a pivot shaft 116 formed by a pair of coaxial trunnions 118, 119, separated by an eccentric center shaft portion 121, solid with the trunnions. The latter are mounted respectively on the plates 13, 15, conventionally by ball bearings 123, 125, for free rotation relative to the plates. The eccentric center portion 121, on the other hand, is similarly mounted on the shear blade 109 by roller bearings 127. The latter are separated from the frame plates 13, 15, by annular trust plates.

In this manner, it will be appreciated that the shaft 116 is free to rotate with respect to the plates 13, 15, and the shear blade 109. When thus rotating, the shear blade oscillates by virtue of the eccentric portion 121.

Rotation of the shaft 116, independently of the pivoting of the blade 109, is obtained by an electric motor 129 fixed to the plate 15 and of which the output shaft 131 is inserted in and properly keyed to the trunnion 119.

Thus, and according to the invention, the above pivot arrangement allows an oscillating motion as well as a conventional scissors-like shear motion to be applied to the shear blades 107, 109. The latter can then act more efficiently in felling trees by alleviating the crushing pressure present when only a shear motion is applied.

I claim:

1. In a tree shear comprising: a frame; a pair of shear blades mounted on said frame for pivotal movement relative to one another in scissors fashion, and power means for pivoting said blades, the improvement wherein:

said blades are mounted on said frame by pivot means including oscillation means for causing said blades to move back and forth in the planes thereof as said blades are pivoted by said power means wherein said oscillation means are eccentric means.

2. A tree shear as claimed in claim 1, wherein said eccentric means comprise, for each blade, a rotary shaft having an eccentric center portion on which said blade is freely mounted.

3. A tree shear as claimed in claim 2, wherein said frame comprises a pair of parallel plates spaced from one another, said blades being located between said plates; said shafts each further having a pair of coaxial trunnions solid with said eccentric center portions; bearing means mounting said trunnions on said plates for free rotation of said shafts, and motor means for rotating said shaft.

4. A tree shear as claimed in claim 3, wherein said motor means comprise: a motor for each of said blades; means securing said motors to one of said plates, and means operatively connecting said motors to one of said trunnions of said shafts for rotating said shafts.

5. A tree shear as claimed in claim 4, wherein said power means comprise: a pair of fluid pressure operated jacks each having one end pivoted to said frame and the other end pivoted to one of said blades, constructed to cause said blades to pivot about said shafts.

6. A tree harvester comprising:

an elongated boom;

a tree working head comprising: an elongated frame having a longitudinal axis; a pair of shear blades mounted on said frame for pivotal movement in scissors fashion relative to one another in a plane normal to said frame longitudinal axis, and power means for pivoting said blades;

wherein said blades are mounted on said frame by pivot means including oscillation means for causing said blades to move back and forth in said normal plane as said blades are pivoted by said power means;

means pivotally mounting said head on one end of said boom, and power means, on said head and on said boom, for so pivoting said head between a position wherein said head stands essentially parallel to said boom and a vertical position for shearing trees wherein said oscillation means are eccentric means comprising, for each one of said blades, a rotary shaft having an eccentric center portion on which said one blade is mounted.

7. A tree harvester as claimed in claim 6, wherein said frame comprises a pair of parallel plates spaced from one another, said blades being located between said plates; said shafts each further having a pair of coaxial trunnions solid with said eccentric center portions; bearing means mounting said trunnions on said plates for free rotation of said shafts, and motor means for rotating said shaft.

8. A tree harvester as claimed in claim 7, wherein said motor means comprise: a motor for each of said blades; means securing said motors to one of said plates, and means operatively connecting said motors to one of said trunnions of said shafts for rotating said shafts.

9. A tree harvester as claimed in claim 6, wherein said working head further comprises: a pair of grapple arms for grippingly securing said head onto a tree to be sheared, said arms being mounted one next to the other on said frame for pivotal movement about parallel axes and in parallel planes normal to said frame longitudinal axis, and power means for pivoting said arms.

10. A tree harvester as claimed in claim 9, wherein said power means for pivoting said shearing blades and said grapple arms are fluid pressure operated jacks having one end pivoted to said blades and arms and the other end pivoted to said frame.

11. A tree harvester as claimed in claim 9, wherein said parallel pivot axes of said arms are coaxial with the respective pivot axes of said blades.

* * * * *